US012716296B2

(12) United States Patent
Hrouzek et al.

(10) Patent No.: US 12,716,296 B2
(45) Date of Patent: Aug. 25, 2026

(54) FALL PROTECTION SYSTEM

(71) Applicant: Honeywell Safety Products USA, Inc., Charlotte, NC (US)

(72) Inventors: Jan Hrouzek, Brno (CZ); Vaclav Hruza, Brno (CZ)

(73) Assignee: Honeywell Safety Products USA, Inc., Latham, NY (US)

( * ) Notice: Subject to any disclaimer, the term of this patent is extended or adjusted under 35 U.S.C. 154(b) by 513 days.

(21) Appl. No.: 18/337,768

(22) Filed: Jun. 20, 2023

(65) Prior Publication Data

US 2024/0426175 A1 Dec. 26, 2024

(51) Int. Cl.
*E06C 7/18* (2006.01)
*A62B 35/00* (2006.01)
*A62B 35/04* (2006.01)

(52) U.S. Cl.
CPC .......... *E06C 7/187* (2013.01); *A62B 35/0075* (2013.01); *A62B 35/0081* (2013.01); *A62B 35/04* (2013.01); *A62B 35/005* (2013.01)

(58) Field of Classification Search
CPC ....... E06C 7/186; E06C 7/187; A62B 35/005; A62B 35/0062; A62B 35/0075; A62B 35/0081; A62B 35/04
See application file for complete search history.

(56) References Cited

U.S. PATENT DOCUMENTS 4,071,926 A * 2/1978 Sweet ..................... E06C 7/187 182/8
9,168,402 B2 10/2015 Casebolt et al.
2009/0133977 A1 5/2009 Warren
2010/0012424 A1* 1/2010 Krauss ................... A62B 35/04 182/3
2011/0094839 A1 4/2011 Blomberg et al.
2012/0220680 A1* 8/2012 Bastioli ................... C08L 67/02 524/21

(Continued)

FOREIGN PATENT DOCUMENTS

EP 2870982 B1 4/2018
EP 2877251 B1 1/2020

(Continued)

OTHER PUBLICATIONS

Extended European Search Report Mailed on Nov. 8, 2024 for EP Application No. 24176377, 8 page(s).

*Primary Examiner* — Brian E Glessner
(74) *Attorney, Agent, or Firm* — Fredrikson & Byron, P.A.

(57) ABSTRACT

Systems, assemblies, and/or the like are provided. In some embodiments, A fall protection system includes an absorber assembly including an absorber body, wherein the absorber body defines a nose portion and a locking portion, and wherein the absorber body is configured to transition from a non-deformed state to a deformed state when the absorber body is subject to one or more loading forces; and a shuttle body configured to secure the fall protection system to a rail, wherein the shuttle body defines a counter-locking portion configured to engage with the locking portion when the fall protection system is subject to the one or more loading forces. In some embodiments, the absorber body further defines one or more holes configured to distribute the one or more loading forces throughout the absorber assembly during deformation.

11 Claims, 5 Drawing Sheets

(56) References Cited

U.S. PATENT DOCUMENTS

| | | | | |
|---|---|---|---|---|
| 2014/0020988 | A1 | 1/2014 | Casebolt et al. | |
| 2015/0129357 | A1 | 5/2015 | Roth | |
| 2017/0183910 | A1* | 6/2017 | Roth | A62B 35/0062 |
| 2017/0260762 | A1* | 9/2017 | Ostrobrod | E04G 21/3204 |
| 2019/0282842 | A1* | 9/2019 | Voss | E06C 7/187 |
| 2020/0141185 | A1* | 5/2020 | Lin | E06C 7/16 |
| 2021/0128955 | A1 | 5/2021 | Marak et al. | |
| 2022/0145703 | A1* | 5/2022 | Atkinson | A62B 35/0081 |
| 2023/0158348 | A1* | 5/2023 | Faber | A62B 35/0081 188/65.1 |

FOREIGN PATENT DOCUMENTS

| | | | | |
|---|---|---|---|---|
| EP | 3815748 | A1 | 5/2021 | |
| WO | WO-9949939 | A1 * | 10/1999 | A62B 35/04 |
| WO | 2011/049674 | A1 | 4/2011 | |
| WO | 2023/089322 | A1 | 5/2023 | |

* cited by examiner

FALL PROTECTION SYSTEM

TECHNICAL FIELD

The present disclosure relates generally to fall protection systems. In particular, it relates to locking features for vertical rail shuttles used in fall protection systems.

BACKGROUND

Technicians may use fall protection systems for their own safety when working at altitudes where a fall could cause serious damage to the technicians' bodies, as well as to any equipment they may be carrying. A fall protection system may be integrated with a rail or ladder that the technician is climbing to reach the height where work is required. For example, a fall protection system may have one or more components configured to secure or "anchor" technicians to the rail or ladder, such that if they lose their grip, the fall protection system will secure them to the rail or ladder. During these instances, fall protection systems may need to absorb the dynamic (e.g., falling) load of the technician, while simultaneously keeping the components of the system from interfering with one another. For example, when undergoing one or more loading forces, one or more components of the fall protection system may be impacted (either with each other or the rail or ladder), causing damage to the system while potentially endangering the safety of the technician and/or the integrity of any equipment.

Through applied effort, ingenuity, and innovation, Applicant has solved problems relating to fall protection systems by developing solutions embodied in the present disclosure, which are described in detail below.

SUMMARY

In general, embodiments of the present disclosure provide systems, assemblies, and/or the like.

In accordance with various embodiments of the present disclosure, there is provided a fall protection system including an absorber assembly including an absorber body, wherein the absorber body defines a nose portion and a locking portion, and wherein the absorber body is configured to transition from a non-deformed state to a deformed state when the absorber body is subject to one or more loading forces; and a shuttle body configured to secure the fall protection system to a rail, wherein the shuttle body defines a counter-locking portion configured to engage with the locking portion when the fall protection system is subject to the one or more loading forces.

In some embodiments, the absorber body further defines one or more holes configured to distribute the one or more loading forces throughout the absorber assembly during deformation.

In some embodiments, the absorber assembly includes a shock absorber.

In some embodiments, the locking portion includes one or more notches in the absorber body, and wherein the counter-locking portion includes one or more protrusions configured to operably engage with the one or more notches when the absorber body transitions from a non-deformed state to a deformed state.

In some embodiments, the fall protection system includes an attachment mechanism configured to secure the fall protection system to a user, wherein the attachment mechanism is operably engaged with the absorber assembly by a fastening device.

In some embodiments, the attachment mechanism includes a carabiner.

In some embodiments, the fall protection system includes a fastening device configured to operably engage the absorber assembly to the shuttle body, wherein the fastening device includes a base configured to swivel such that the attachment mechanism is rotatable relative to the absorber assembly.

In some embodiments, the one or more loading forces include one or more forces ranging up to 16 kilo-Newtons.

In some embodiments, the absorber body defines a line of deformation along which the absorber body is configured to transition from the non-deformed state to the deformed state.

In some embodiments, the nose portion is configured to lock with a notch of the rail when the absorber body is in the deformed state.

In some embodiments, the locking portion is configured to operably engage with the counter-locking portion such that the nose portion refrains from deforming against the notch of the rail when the absorber body is in the deformed state.

In some embodiments, the rail is integrated into a ladder.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same embodiment).

OVERVIEW

According to various embodiments, fall protection systems may be used to ensure the safety of technicians and the integrity of their equipment when working in environments where there is a risk of falling and being severely injured. Fall protection systems may be secured to rails connected to ladders (e.g., ladder 13 on which technicians are working. When technicians lose their grips, fall protection systems operate to keep them attached to the rail 12/ladder 13, thereby reducing fall damage; this causes the fall protection system to undergo one or more loading forces, which may damage the structural integrity of one or more components of the fall protection system, as previously described.

In some embodiments, and as will be described in detail in this disclosure, a fall protection system may include an attachment mechanism (which can secure the technician to the system), a shuttle assembly (which can secure the fall protection system to the rail), and an absorber assembly (which can deform and absorb the aforementioned loading forces in the event of a fall).

In some embodiments, the absorber assembly may include a body defining a nose portion and a locking portion, as well as one or more holes distributed throughout the body. In some embodiments, the shuttle assembly may define a shuttle body having a counter-locking portion. When the fall protection system is subject to the one or more loading forces, the locking portion of the absorber assembly may engage with the counter-locking portion of the shuttle assembly, thereby arresting at least some motion of the absorber assembly and preventing the nose portion of the absorber body from substantially deforming and/or breaking against the rail.

Example Fall Protection Systems

Figure 1:
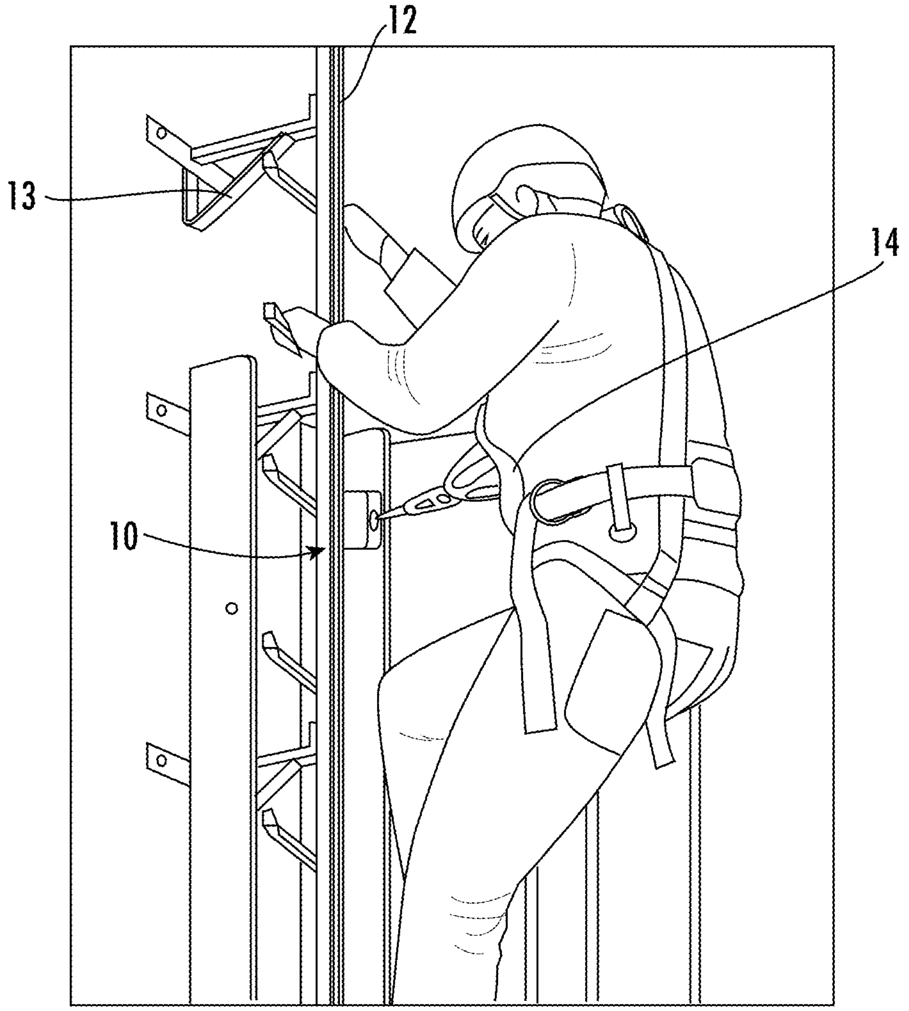
FIG. 1 shows a bottom angle view of an operator using a fall protection system in accordance with various embodiments of the present disclosure.
Figure 2:
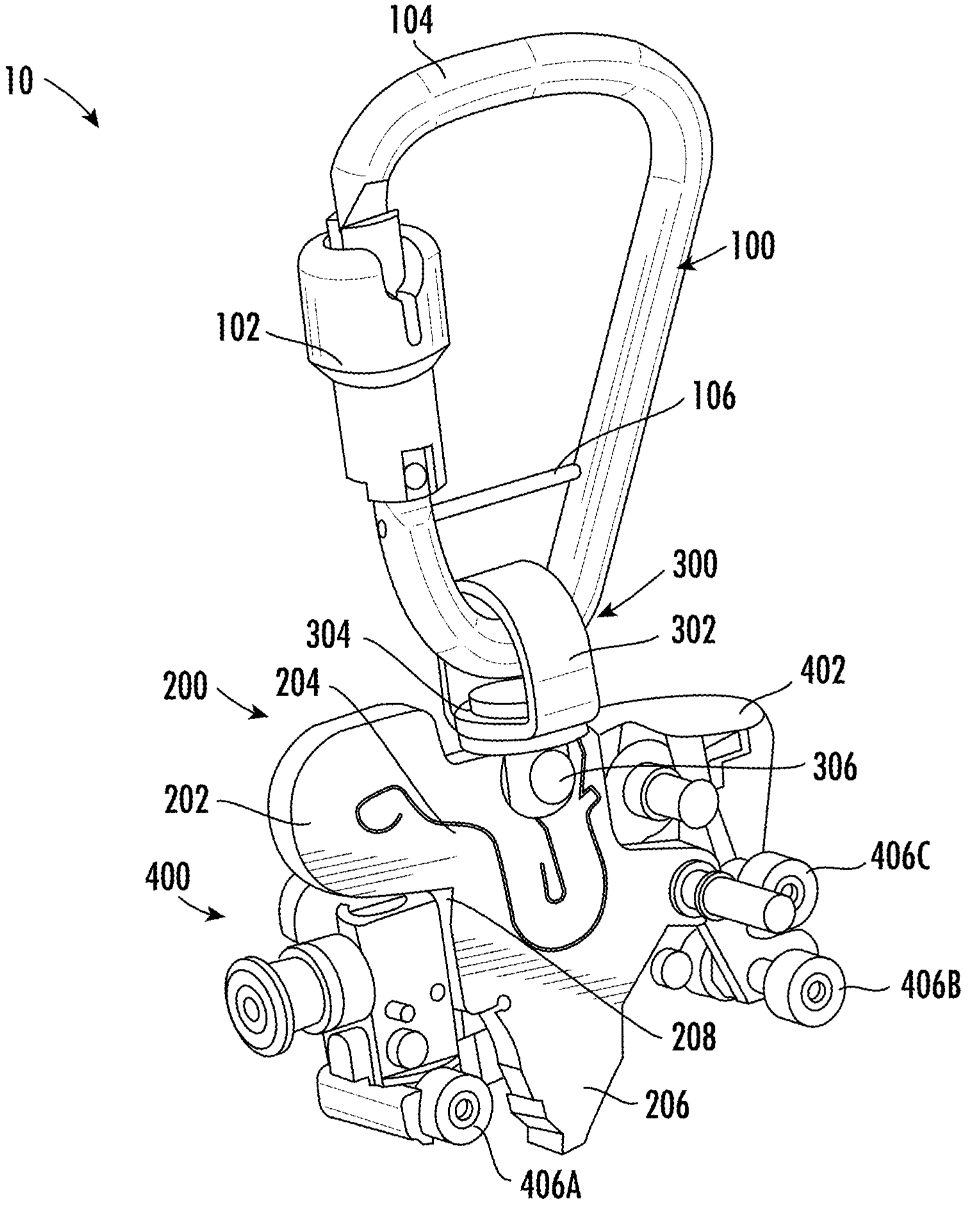
FIG. 2 shows an angled view of an example fall protection system in accordance with various embodiments of the present disclosure.
Figure 3:
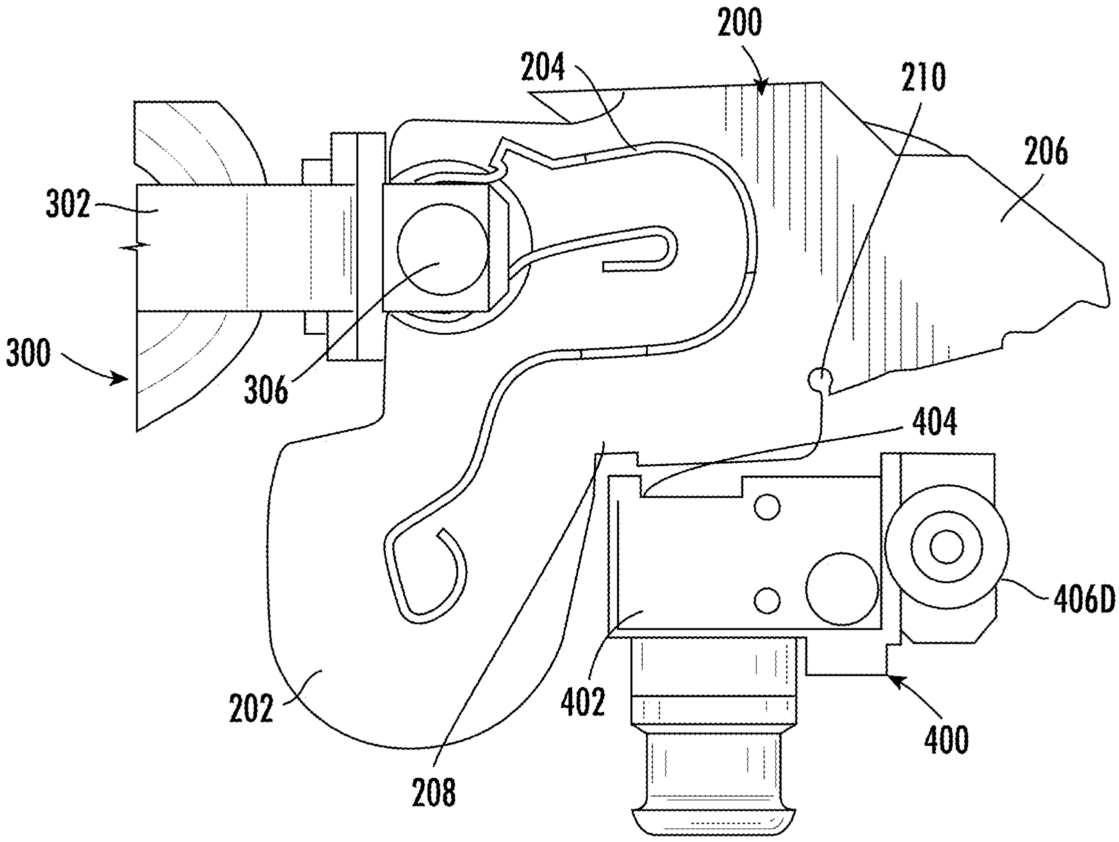
FIG. 3 shows an elevation side view of an example fall protection system in accordance with various embodiments of the present disclosure.

FIG. 1 shows a bottom angle view of a technician using a fall protection system 10 and FIG. 2 shows an angled view of the fall protection system 10, in accordance with various embodiments. FIG. 1 further shows that the fall protection system 10 may be operably engaged to a rail 12 that may be either integrated with or positioned adjacent to a ladder 13. In some embodiments, the fall protection system 10 may be attached to a harness 14 or similar attachment apparel worn by the technician, thereby securing the technician to the rail 12 via the fall protection system 10. As will be described later, the fall protection system 10 may travel along the rail 12 along with the technician (i.e., the fall protection system 10 may slide vertically as the technician ascends or descends the ladder 13).

In some embodiments (referring now to at least FIG. 2), the fall protection system 10 may include an attachment mechanism 100 that may be attached to the harness 14 worn by the technician. In some embodiments, the attachment mechanism 100 may vary in length as necessary as the technician ascends or descends the ladder 13 and the fall protection system 10 moves along the rail 12. In some embodiments, the attachment mechanism 100 may be a carabiner and may further be a solid, ring-shaped body configured to be secured or otherwise fastened to a loop or connection point on the harness 14.

In some embodiments, the attachment mechanism 100 may include a latching mechanism 102. In some embodiments, the latching mechanism 102 may be configured to open or close a loop portion 104 of the attachment mechanism 100. When the loop portion 104 is opened, the attachment mechanism 100 may be secured to one or more other components; that is, one or more components may be secured around or within the loop portion 104. Once the attachment mechanism 100 has been secured to the one or more other components, the latching mechanism 102 may be closed. In some embodiments, the closed latching mechanism 102 may not be opened except by manual input of the technician.

In some embodiments, the attachment mechanism 100 may include a pin 106. The pin 106 may be configured to stretch across the loop portion 104 of the attachment mechanism 100. In some embodiments, the pin 106 may be configured to secure the attachment mechanism 106 to one or more components of the fall protection system 10.

In some embodiments, the fall protection system 10 may include an absorber assembly 200. In some embodiments, the absorber assembly 200 may include an absorber body 202. The absorber body 202 may be configured to deform when subject to one or more loading forces. In at least this way, the fall protection system 10 may absorb the one or more loading forces and keep the technician secured to the rail 12/ladder 13. In some embodiments, the absorber body 202 may define a line of deformation (LOD) 204. The absorber body 202 may be configured to deform along the LOD 204. In some embodiments, the LOD 204 may be defined during manufacturing of the absorber assembly 200, such that the absorber body 202 deforms along a desired path/trajectory when the fall protection system is subject to the one or more loading forces.

In some embodiments, the absorber body 202 may define a nose portion 206. The nose portion 206 may be positioned in proximity to the rail 12 when the fall protection system 10 is engaged to the rail 12. The nose portion 206 may be configured to engage/contact the rail 12 when the absorber body 202 is subject to the one or more loading forces and deforms.

In some embodiments, the absorber body 202 may define a locking portion 208. In some embodiments, the locking portion 208 may be a notched/cut out portion of the absorber body 202. The locking portion 208 can include one more notches configured to engage with counter-locking portions, as will be described in greater detail later in this disclosure.

In some embodiments, the absorber body 202 may define one or more holes 210. In some embodiments, the one or more holes 210 may be distributed throughout the absorber body 202 in order to distribute the one or more loading forces throughout the absorber assembly during deformation. The one or more holes may be placed, for example, in the nose portion 206, and on various sides of the LOD 204. In some embodiments, the diameter(s) of the one or more holes 210 may be increased or decreased, as desired, to more effectively distribute the one or more loading forces. In some embodiments, the holes 210 may be intentionally placed "weak spots" (i.e., spots where the absorber body 202 will first deform). The holes 210 may be positioned so that the absorber body 202 deforms in a desired direction. For example, the holes 210 may be positioned such that the locking portion 208 operably engages with one or more counter-locking portions, as will be described later in this disclosure.

In some embodiments, the absorber assembly 200 may be operably engaged with the attachment mechanism 100 via a fastening device 300. In some embodiments, the fastening device 300 may include a loop portion 302. In some embodiments, the loop portion 302 be a solid, half-ring-shaped component through which the attachment mechanism 100 may be connected. In some embodiments, the pin 106 of the attachment mechanism 100 may be configured to secure the attachment mechanism 100 to the loop portion 302 of the fastening device 300. The loop portion 104 of the attachment mechanism 100 may be configured to interlock with the loop portion 302 of the fastening device 300 (e.g., via unlatching the latching mechanism 102, interlocking the loop portions 104, 302, and then latching the latching mechanism 102).

In some embodiments, the fastening device 300 may include a base plate 304. In some embodiments, one or more components of the fastening device 300 may be disposed around the base plate 304; in some embodiments, the distribution may be symmetrical. In some embodiments, the base plate 304 may be a swivel. The swiveling base plate 304 may provide 360° rotation of the attachment mechanism 100 relative to the absorber assembly 200. The base plate 304 swiveling may enable a technician to engage with the attachment mechanism 100 in a variety of positions and configuration when using the fall protection system 10.

In some embodiments, the fastening device 300 may include a pin 306. In some embodiments, the pin 306 may be secured through one or more holes in the absorber assembly 200 and the fastening device 300. It will be understood that the pin 306 may be one or more alternative fasteners (e.g., hook-and-loop, adhesive, nut-and-bolt), as desired, to secure the attachment mechanism 100 to the absorber assembly 200.

In some embodiments, the fall protection system 10 may include a shuttle assembly 400 configured to engage with and secure the fall protection system to the rail 12. In some embodiments, the shuttle assembly 400 may be operably engaged to the absorber assembly 200. In some embodiments, the shuttle assembly 400 may include a shuttle body 402.

In some embodiments, the shuttle assembly 400 may include one or more components and/or features configured to interlock with one or more features of the absorber assembly 200. In some embodiments, the shuttle body 402 may include a counter-locking portion 404. In some embodiments, the counter-locking portion 404 may be a protrusion disposed adjacent to a notch or cut out portion. The counter-locking portion 404 may be configured to receive and/or operably engage with the locking portion 208 of the absorber body 202. In some embodiments, the counter-locking portion 404 may be configured to "catch" the locking portion 208 when the absorber body 202 deforms. In some embodiments, the counter-locking portion 404 may have protrusions and/or notches that correspond to protrusions/notches on the locking portion 208 of the absorber assembly 200.

The shuttle assembly 400 may include one or more wheels 406A-D configured to run along the rail 12, thereby allowing the shuttle assembly 400 to smoothly travel along the rail 12 as the technician climbs the ladder 13. The one or more wheels 406A-D may be attached to the shuttle body 402 (e.g., via one or more fasteners).

Figure 4:
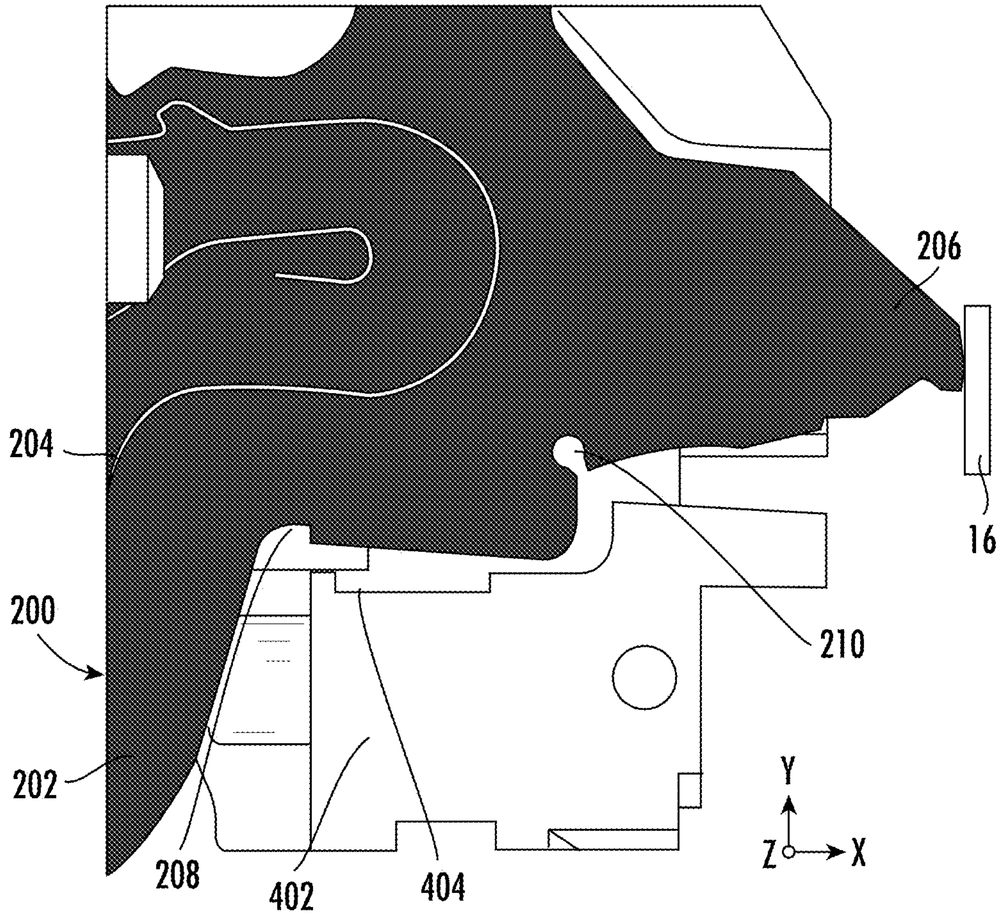
FIG. 4 shows an elevation side view of an example, undeformed fall protection system in accordance with various embodiments of the present disclosure.
Figure 5:
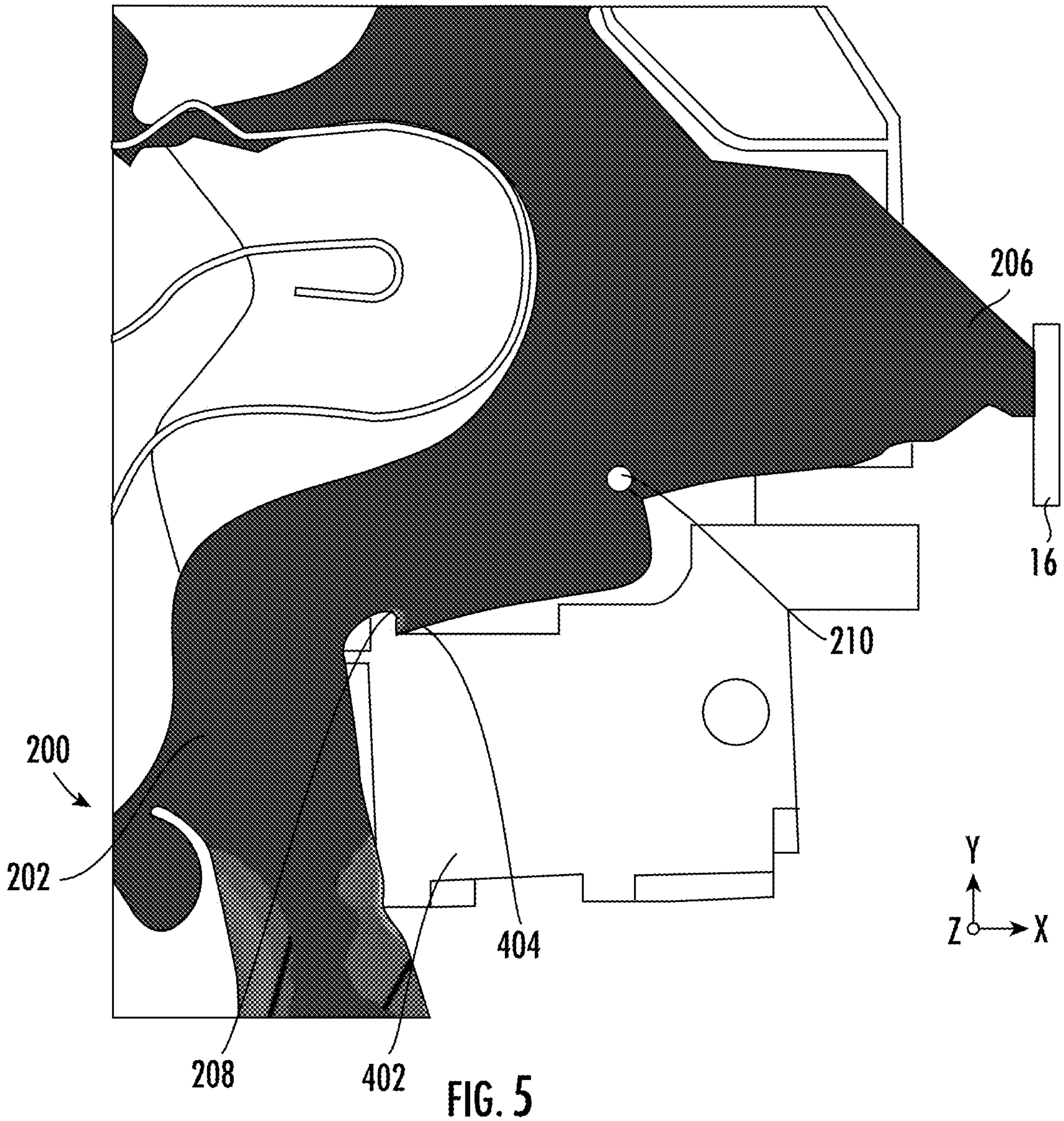
FIG. 5 shows an elevation side view of an example, deformed fall protection system in accordance with various embodiments of the present disclosure.

Referring now to FIGS. 4 and 5, a transition of the absorber assembly 200 from a non-deformed state (FIG. 4) to a deformed state (FIG. 5) is shown. As previously mentioned, the deformation may be caused by the one or more loading forces acting on the fall protection system 10, which may result when the technician loses his or her grip on the ladder and the fall protection system 10 activates. As can be seen in the figures, the absorber assembly deforms along the LOD 204. As shown in FIGS. 4 and 5, the rail 12 may have a notch 16, into which the nose portion 206 may come into contact when the fall protection system 10 is subject to the one or more loading forces. In some embodiments, and as previously mentioned, the locking portion 208 may engage with the counter-locking portion 404 of the shuttle body 402, thereby arresting the motion of the absorber assembly 200 when it is subject to one or more loading forces. In some embodiments, the counter-locking portion 404 may be configured to arrest the motion of the absorber assembly 200 such that the nose portion 206 does not substantially deform against the notch 16.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A fall protection system comprising:

an absorber assembly comprising an absorber body, wherein the absorber body defines a nose portion and a locking portion, and wherein the absorber body is configured to transition from a non-deformed state to a deformed state when the absorber body is subject to one or more loading forces; and a shuttle body configured to secure the fall protection system to a rail, wherein the shuttle body defines a counter-locking portion configured to engage with the locking portion when the fall protection system is subject to the one or more loading forces, and wherein the nose portion is configured to lock with a notch of the rail when the absorber body is in the deformed state.

2. The fall protection system of claim 1, wherein the absorber body further defines one or more holes configured to distribute the one or more loading forces throughout the absorber assembly during deformation.

3. The fall protection system of claim 1, wherein the absorber assembly comprises a shock absorber.

4. The fall protection system of claim 1, wherein the locking portion comprises one or more notches in the absorber body, and wherein the counter-locking portion comprises one or more protrusions configured to operably engage with the one or more notches when the absorber body transitions from the non-deformed state to the deformed state.

5. The fall protection system of claim 1, further comprising an attachment mechanism configured to secure the fall protection system to a user.

6. The fall protection system of claim 5, wherein the attachment mechanism comprises a carabiner.

7. The fall protection system of claim 5, further comprising a fastening device configured to operably engage the absorber assembly to the attachment mechanism, wherein the fastening device comprises a base configured to swivel such that the attachment mechanism is rotatable relative to the absorber assembly.

8. The fall protection system of claim 1, wherein the one or more loading forces comprise one or more forces ranging up to 16 kilo-Newtons.

9. The fall protection system of claim 1, wherein the absorber body defines a line of deformation along which the absorber body is configured to transition from the non-deformed state to the deformed state.

10. The fall protection system of claim 1, wherein the locking portion is configured to operably engage with the counter-locking portion such that the nose portion refrains from substantially deforming against the notch of the rail when the absorber body is in the deformed state.

11. The fall protection system of claim 1, wherein the rail is integrated into a ladder.

* * * * *